(12) United States Patent
Gröning et al.

(10) Patent No.: US 10,017,067 B2
(45) Date of Patent: Jul. 10, 2018

(54) METHOD FOR ENSURING FUNCTIONAL RELIABILITY IN ELECTROMOBILITY BY MEANS OF DIGITAL CERTIFICATES

(75) Inventors: Sven Gröning, Marl (DE); Jens Schmutzler, Dortmund (DE); Christian Wietfeld, Dortmund (DE)

(73) Assignee: TECHNISCHE UNIVERSITAT DORTMUND, Dortmund (DE)

( * ) Notice: Subject to any disclaimer, the term of this patent is extended or adjusted under 35 U.S.C. 154(b) by 366 days.

(21) Appl. No.: 14/420,514

(22) PCT Filed: Aug. 9, 2012

(86) PCT No.: PCT/EP2012/065564
§ 371 (c)(1),
(2), (4) Date: Oct. 29, 2015

(87) PCT Pub. No.: WO2014/023349
PCT Pub. Date: Feb. 13, 2014

(65) Prior Publication Data
US 2016/0052416 A1 Feb. 25, 2016

(51) Int. Cl.
*B60L 11/18* (2006.01)
*H04L 9/32* (2006.01)
*G07F 15/00* (2006.01)

(52) U.S. Cl.
CPC ........ *B60L 11/1838* (2013.01); *G07F 15/005* (2013.01); *H04L 9/3247* (2013.01);
(Continued)

(58) Field of Classification Search
CPC .... Y02T 90/169; Y02T 90/16; B60L 11/1846; B60L 11/1848; B60L 11/1824;
(Continued)

(56) References Cited

U.S. PATENT DOCUMENTS

| 5,565,755 A | 10/1996 | Keith et al. |
| 2005/0289349 A1* | 12/2005 | Franke ......... H04L 9/3263 713/176 |

(Continued)

FOREIGN PATENT DOCUMENTS

| DE | 103 04 284 A1 | 8/2004 |
| DE | 102010026689 | 1/2012 |

(Continued)

OTHER PUBLICATIONS

International Search Report Issued in corresponding International Application PCT/EP2012/065564, dated Jan. 15, 2013.
(Continued)

*Primary Examiner* — Dale Moyer
(74) *Attorney, Agent, or Firm* — Davidson, Davidson & Kappel, LLC

(57) ABSTRACT

The present invention relates to a method for ensuring functional reliability of components (5), which participate in a charging operation, of the electromobility technology of an actuator (4) which is formed in particular as an electric vehicle or electric charging station, in connection with the charging operation or during a test, wherein at least one of the participating components (5) comprises a module (6) for the implementation of security functions in which a first assigned certificate of a technical test station (3) concerning a means for carrying out a self-diagnosis of the component (5) and a second assigned certificate (11) of a manufacturer (2) are stored, characterized by the following steps to be carried out in the participating components (5): (1*a*) activating a self-diagnosis, (1*b*) providing a result of the self-diagnosis of the component (5) with a signature by means of the second assigned certificate (11) of the manufacturer (2), (1*c*) transmitting to the technical test station (3) the results of the self-diagnoses, provided with the signatures, and an assignment of the results to the actuator (4), (1*d*) checking
(Continued)

the validity of the signatures and validating the results of the self-diagnoses, and (1e) decision about issuing a temporary certificate (12) on the basis of the validity of the component signatures and a result of the validation.

11 Claims, 1 Drawing Sheet

(52) U.S. Cl.
CPC ......... *H04L 9/3263* (2013.01); *B60L 2270/32* (2013.01); *H04L 2209/84* (2013.01); *Y02T 10/7005* (2013.01); *Y02T 10/7072* (2013.01); *Y02T 90/121* (2013.01); *Y02T 90/128* (2013.01); *Y02T 90/14* (2013.01); *Y02T 90/163* (2013.01)

(58) Field of Classification Search
CPC .............. B60L 11/1838; B60L 11/1816; B60L 11/1818; B60L 11/1825; H04L 63/0823; H04L 9/3263; H04L 2209/84
See application file for complete search history.

(56) References Cited

U.S. PATENT DOCUMENTS

| | | | | |
|---|---|---|---|---|
| 2006/0143474 | A1* | 6/2006 | Knechtel | G06F 21/33 713/189 |
| 2009/0224939 | A1* | 9/2009 | Stocker | B60L 11/1842 340/870.02 |
| 2011/0140835 | A1 | 6/2011 | Ishibashi | |
| 2011/0213983 | A1* | 9/2011 | Staugaitis | B60L 11/1824 713/176 |
| 2012/0041855 | A1 | 2/2012 | Sterling et al. | |
| 2013/0091565 | A1* | 4/2013 | Kafer | B60L 11/1816 726/21 |
| 2013/0159717 | A1* | 6/2013 | Rabadi | G06F 21/572 713/176 |
| 2015/0329005 | A1* | 11/2015 | Oishi | H04L 67/18 701/22 |

FOREIGN PATENT DOCUMENTS

| | | |
|---|---|---|
| EP | 1401144 | 3/2004 |
| EP | 2099002 | 9/2009 |
| EP | 2479731 | 7/2012 |
| JP | 0944562 | 2/1997 |
| WO | WO-2010/009502 | 1/2010 |
| WO | WO-2010/028082 | 3/2010 |
| WO | WO-2011/154218 | 12/2011 |

OTHER PUBLICATIONS

XP055231034, Public key certificate.
XP055231059, Digital signature.
XP055231314, Root certificate.
Office Action from European Search Report in corresponding European Application No. 12748416.0 dated Dec. 2, 2015.
Preliminary Report on Patentability from the Intellectual Bureau of WIPO, dated Feb. 10, 2015, issued in connection with corresponding International Application No. PCT/EP2012/065564.
Dattenblatt, "Das Diagnose-Entwicklerwerkzeug für Volkswagen-Konzernfahrzeuge" softing Automotive Electronics GmbH, Richard-Reitzner-Allee 6 85540 Haar, Germany , pp. 1-2.
English Translation of Reference A03.
Network booting—Wikipedia (XP055306319).

* cited by examiner

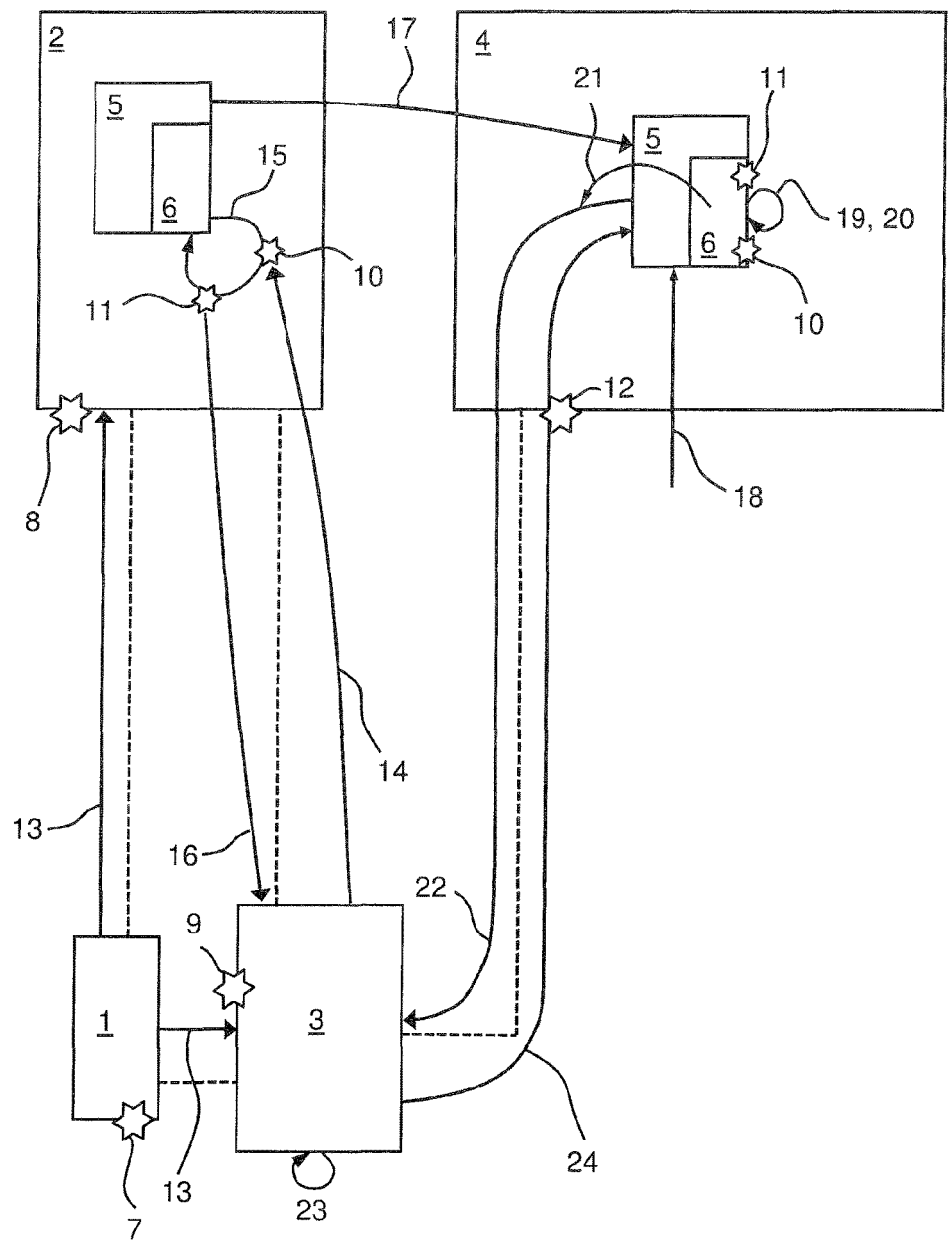

METHOD FOR ENSURING FUNCTIONAL RELIABILITY IN ELECTROMOBILITY BY MEANS OF DIGITAL CERTIFICATES

This application is a U.S. national phase application under 35 U.S.C. of § 371 of International Application No. PCT/EP2012/065564, filed Aug. 9, 2012, the disclosure of which is hereby incorporated by reference herein.

FIELD OF THE INVENTION

The present invention relates to a method for ensuring functional reliability in electromobility by means of digital certificates within the context of a charging process or in the course of an examination in accordance with the subject-matter of independent claim 1.

The invention came about as part of a project promoted by the Federal Ministry for Economic Affairs and Technology (BMWi) with the promotion number 01ME09012.

BACKGROUND OF THE INVENTION

With the introduction of electromobility, the process of "filling up" has turned into a charging process for an electric vehicle. In particular, on the basis of the prior art, data communication between the electromobility components takes place before the charging process for the purpose of authentication.

In a charging process that is known from the prior art, the communication coupling between charging station and electric vehicle both for conductive and for inductive charging takes place fully automatically. The signaling and communication processes to date for conductive charging according to IEC 61466, IEC 62251 and according to the draft standards according to ISO/IEC 20822 are used to ensure electrical functional reliability on the basis of preconfigured parameterization, and allow energy network compatible control and planning of a charging process, reciprocal authentication of directly involved (primary) acting items such as an electric vehicle and a charging station and of indirectly involved (secondary) acting items, and the authorization of the charging process. The processes of authentication for an identity (identification) and authorization allow pre/postpaid billing for the electric power drawn for charging.

Such a method for identification between an electric vehicle and a charging station without interaction with a vehicle user is described in the laid-open specification DE 103 04 284 A1, for example. In one embodiment for the method, it is possible to transmit not just data for identification but also further data that can be used for an optimum charging process.

The U.S. application US 2011/0140835 A1 describes a method using data communication, protected by password encryption, for authentication between an electric vehicle and a charging station as a prerequisite for authorization of a charging process, wherein the data communication is effected via a wired or wireless network. Following termination of the charging process, the authentication is additionally used for correct assignment of an energy tax on an energy value drawn for charging with the electric vehicle involved in the charging process.

Whereas, when filling up with liquid fuel, there are significant risks of the fuel igniting while filling up, a charging process for a battery has considerable risks for the functional reliability of the battery and of other components involved in the charging process. The battery of the electric vehicle is a large cost factor, and damage is linked to a high level of financial risk. In addition, the charging process for electric vehicles, in contrast to traditional filling-up processes with liquid fuels, is usually an unsupervised process that possibly takes place in a public space. There is a potential for considerable damage to health to be caused; in the event of a fire or an explosion, there is particularly a danger to life and limb.

Therefore, checking and certifying the functional reliability of all components involved in the charging process is of considerable importance. A fundamental examination of the functional reliability of electromobility components, particularly of electric vehicles and charging stations, takes place in the design and manufacture process, during commissioning and during regular technical acceptance tests or examinations and is used for parameterization or observance of the parameterization of the aforementioned standards. For every intended charging process for the electric vehicle using a charging station in a public or private space, however, in order to increase safety it is again necessary to answer the question of whether the technical components of the vehicle and the charging station that are directly involved in the charging process are fully functional at the time of the scheduled charging process.

SUMMARY OF THE INVENTION

It is therefore particularly the object of the invention to specify a method that, before a charging process for an electric vehicle or in the course of an examination, allows the present technical functional reliability of electromobility components involved in a charging process, particularly of electric vehicles and charging stations, to be ensured in order to increase the safety of the charging process.

DISCLOSURE OF THE INVENTION

First of all, to allow the disclosure that follows to be clearly understood, a few terms will be defined that arise in the description below.

In this context, "authentication" is intended to be understood to mean particularly the provision of evidence of specific properties.

In this context, "identification" is intended to be understood to mean particularly authentication of an identity.

In this context, "certification" is intended to be understood to mean particularly the verification of observance of particular requirements.

In this context, "authorization" is intended to be understood to mean particularly the allocation of an entitlement.

The subject-matter of the present invention is a method for ensuring functional reliability for electromobility components of an acting item, which is particularly formed as an electric vehicle or electric charging station, that are involved in a charging process within the context of said charging process or in the course of an examination, wherein at least one of the components involved comprises a module for implementing security functions in which a first assigned certificate of a technical test center related to a means for executing a self-diagnosis on the component and a second assigned certificate of a manufacturer are deposited.

It is proposed that the method comprises the following steps:

(1a) a self-diagnosis is activated,
(1b) a result of the self-diagnosis on the component is furnished with a signature by means of the second assigned certificate of the manufacturer, (1c) the results, provided with the signatures, of the self-diagnoses and an assignment of the results to the acting item are transmitted to the technical test center, (1d) a validity of the signatures is inspected and the results of the self-diagnoses are validated, and (1e) a decision is taken about issuing a temporary certificate on the basis of the validity of the component signatures and a result of the validation.

In this context, a "module for implementing security functions" is intended to be understood to mean particularly a hardware/software module that is tied to a component and that ensures the integrity of the self-diagnosis methods and protects the results of the self-diagnosis by means of digital certificates. By way of example, the module may be formed by a trusted platform module (TPM) that comprises at least one chip, tied to a hardware entity, that is based on a standard of the trusted computing group (TCG).

In this context, a "technical test center" is intended to be understood to mean particularly a center or a technical test unit, empowered by the center, that is entitled to perform technical acceptance testing for electric vehicles and charging stations and particularly for the electromobility components involved in a charging process.

The effect that can be achieved by the method according to the invention is that the components involved verify their functional reliability in situ before the charging process, which allows functional reliability for charging processes in electric vehicles to be increased. In particular, the decision about issuing a temporary certificate can be taken as a basis for authorizing the electromobility components involved to perform the charging process. In this case, it is particularly possible to use a validity period of the temporary certificate to define the intervals of time in which functional verification is necessary.

In one advantageous embodiment, it is proposed that steps (1d) and (1e) are executed by the technical test center. This allows a particularly high level of safety to be achieved for charging processes in electric vehicles.

In a further advantageous embodiment, it is proposed that for the purpose of reciprocal verification of functional reliability for a plurality of acting items, step (1e) involves at least the decision regarding the result of the validation being taken jointly by the components of the acting items that are involved. In this regard, it is possible, by way of example, for the components to create a valid signature jointly only if all self-diagnosis results are positive. Since the decision regarding the result of the validation is taken to some extent by the components involved, it is possible to attain a relatively short execution time given a sufficiently high level of safety for the charging process.

In addition, it is proposed that in the issuing of the temporary certificate a decision about a functional restriction is taken. This allows the achievement of granularity at functional level and hence of flexible case handling. By way of example, an electric vehicle can be denied a charging process according to charging mode 4 as per IEC 62251-1, but may be permitted to charge according to charging mode 3.

Furthermore, it is proposed that after step (1a) and before step (1b) the following steps are executed for each of the components involved:

(2a) an integrity test of a self-diagnosis method of the component involved is performed using the module for implementing security functions, and (2b) the self-diagnosis method of the component involved is performed if the result of the integrity test is positive.

This allows manipulations on the self-diagnosis methods, which are, for example, in the form of a software program and are known to be possibly subject to manipulation attacks, to be prevented with a high level of security in order to increase safety for charging processes in electric vehicles.

If the first assigned certificate is awarded by the technical test center following a successful examination of a means for executing a self-diagnosis of the component, observance of criteria, which can be defined by the test center, for fulfilling the functional reliability of the component is facilitated in a particularly simple manner in order to achieve consistency for requirements on safety for charging processes in electric vehicles.

In addition, it is proposed that the activation of the self-diagnosis is initiated by a trigger. In this case, the connection of an electric vehicle, of a charging station or of a test center test automaton can advantageously be defined as a trigger for activating the self-diagnosis, for example. Furthermore, a trigger can advantageously be defined by meeting a predetermined specification, which may be formed by a predetermined charging time or a predetermined number of charging cycles, for example, or which is met by exceeding a predetermined period before a validity period at the temporary certificate expires. This allows a high level of flexibility to be achieved for the embodiment of requirements that are to be met in terms of safety for charging processes in electric vehicles.

In addition, it is proposed that the inspection of the validity of the signatures in step (1d) of the method is effected on the basis of a public portion of the second assigned certificate of the manufacturer, which portion has been deposited at the technical test center by the manufacturer of the respective component at an earlier time. This allows particularly manipulation-proof validation of the results of the self-diagnoses to be achieved.

If the decision about the issuing of the temporary certificate is taken in an automated form on the basis of the validity of the component signatures and the result of the validation, it is possible to provide a particularly fast solution, and one that is convenient for users of electric vehicles, for a safe charging process.

In a further advantageous embodiment of the method, the first assigned certificate of the technical test center and the second assigned certificate of the manufacturer are derived from at least one root certificate. In this context, a "root certificate" is intended to be understood to mean particularly an unsigned public key certificate or self-signed certificate from an upper certification center (root certificate authority), which certificate is used to substantiate the validity of all subordinate certificates. The root certificate is an important part of a public key infrastructure system (PKI system) and may preferably be based on the ISO X.509 standard. This advantageously allows the formation of a certificate chain that allows the manufacturer and the technical test center to be entitled to issue legally effective certificates for test processes or for manufactured components, which can result in considerable simplification for the performance of the method, particularly in view of the number of manufactured products from the manufacturer or from a plurality of manufacturers.

Furthermore, it is proposed that the temporary certificate can be issued either in the course of a regularly scheduled examination by the technical test center for the technical acceptance testing of electromobility components of an acting item, which is particularly formed as an electric vehicle or electric charging station, or in fully automated fashion in the course of an individual charging process. This allows a scope of testing for the activated self diagnosis/ diagnoses to be embodied differently on the basis of the type of examination.

DRAWING

Further advantages will emerge from the description of the drawing that follows. The drawing shows an exemplary embodiment of the invention. The drawing, the description and the claims contain numerous features in combination. A person skilled in the art will expediently also consider the features individually and pool them to form useful further combinations.

BRIEF DESCRIPTION OF THE DRAWINGS

FIG. 1 shows a flowchart for an exemplary embodiment of the method according to the invention.

DETAILED DESCRIPTION OF THE INVENTION

FIG. 1 shows a flowchart of an exemplary embodiment of the method in accordance with the invention for ensuring functional reliability for an electromobility component 5 of an acting item 4, which is particularly formed as an electric vehicle or electric charging station, which component is involved in a charging process, within the context of said charging process or in the course of an examination. For simplification, FIG. 1 merely shows one acting item 4 as a representative of an electric vehicle or of an electric charging station. The method can additionally be transferred to further acting items, however.

Essential objects of the flowchart are a root certification center 1, a manufacturer 2 of the electromobility component 5 involved in the charging process, a technical test center 3 and the acting item 4 as representative of an electric vehicle or of a charging station, which acting item 4, in an operational state, comprises the electromobility component 5. In this case, the component 5 comprises a module 6 for implementing security functions and has a means for performing self-diagnosis methods of the component 5. Communication between the essential objects, which is set up via an arbitrary communication channel, is shown by dashed lines in FIG. 1.

In the method description that follows, the reciprocal authentication and the examination of the validity of certificates are not shown for reasons of clarity. These processes are known to a person skilled in the art and require no further explanation.

First of all, the method steps that have a framework effect in the method according to the invention will be described.

In a first step 13, the technical test center 3 and the manufacturers 2 of the electromobility components 5 (FIG. 1 shows only one manufacturer 2 as representative of all manufacturers 2 of the components for simplification) register with the trustworthy root certification center 1 and are provided with legally effective digital manufacturer certificates 8 or a legally effective digital test center certificate 9. On the basis of an underlying certificate chain, the manufacturer 2 and the technical test center 3 can use the manufacturer certificate 8 and the test center certificate 9, respectively, to issue separate legally effective certificates for test processes or for components 5.

The electromobility components 5 manufactured by the manufacturers 2 have means for performing self-diagnosis methods. The technical test center 3 examines the means for performing the self-diagnosis methods of the components 5 and, after a successful examination 14 of the self-diagnosis methods of the component 5, awards the manufacturers 2 a first certificate 10 assigned to the self-diagnosis method of the component 5. The examination is deemed successful if criteria stipulated by the technical test center 3 for fulfilling the functional reliability of the components 5 are met.

In a manufacturing process 15 for the component 5, the means for performing the self-diagnosis method, including the first certificate 10 from the technical test center 3, are tied to the component 5. To this end, each of the components 5 is provided with a module 6 for implementing security functions in order to preserve the integrity of the certified self-diagnosis method.

During the manufacturing process 15 for the component 5, a digital second certificate 11, assigned to the component 5, of the manufacturer 2 is additionally created in a respective module 6 for implementing security functions. As will be explained in detail below, this second certificate 11 is used to sign all of the results of the self-diagnosis method for the component 5. A public portion of the second certificate is certified by the manufacturer 2 as "privacy certification authority" and transmitted to the technical test center 3 in a step 16. In the course of the installation process 17, the components 5 are assigned to the acting item 4 and commissioned.

Hence, at least one of the components 5 of the acting item 4 involved in the charging process comprises a module 6 for implementing security functions, in which are deposited the first assigned certificate 10 of the technical test center 3 related to the means for executing the self-diagnosis of the component 5, and the second assigned certificate 11 of the manufacturer 2. For each of the components 5 of the acting item 4, the first assigned certificate 10 of the technical test center 3 and the second assigned certificate 11 of the manufacturer 2 are derived from a root certificate 7 of the root certification center 1 using the manufacturer certificate 8 and the test center certificate 9.

This defines the framework for performing a safe charging process between the acting item 4 formed as an electric vehicle and an acting item 4' formed as a charging station, which charging process is described in detail below.

Description of the Charging Process

Connecting a charging cable to the acting items 4 as representatives of an electric vehicle or of a charging station acts on the respectively installed component 5 as a trigger 18 for activating the means of this component 5 for performing a self-diagnosis. Further triggers 18 for activating the means for performing a self-diagnosis, such as the definition of a predetermined value, stored in the acting item 4, for a maximum number of charging processes between two self-diagnoses, for example, are conceivable.

In order to avoid linguistic ambiguities, the subsequent steps 19-24 are described in the manner in which they are executed on precisely one of the components 5. In accordance with the invention, steps 19-24 are executed on at least one of the components 5 involved in the charging process, however.

In a next step 19, the module 6 for implementing security functions for the component 5 involved in the charging process is used to perform an integrity test of the means—formed by a self-diagnosis method—for performing the self-diagnosis of the component 5 involved.

In case of a positive result of the integrity test, the self-diagnosis method is performed on the component 5 involved in the charging process in a next step 20.

In the next step 21, the result of the self-diagnosis of the component 5 involved in the charging process is furnished with a signature by means of the second assigned certificate 11 of the manufacturer 2.

In the subsequent step 22, the result—provided with the signature—of the self-diagnosis and an assignment of the result to the acting item 4 is transmitted to the technical test center 3.

In the next step 23, the technical test center 3 performs an inspection of validity of the signatures, and validation of the results of the self-diagnoses. In this case, the validity of the signatures is inspected on the basis of the public portion of the second assigned certificate 11 of the manufacturer 2, which portion is deposited at the technical test center 3 by the manufacturer 2 of the component 5 in step 16.

In a final step 24 of the method, the technical test center 3 takes a decision about issuing a temporary digital certificate 12. On account of the previously signed results of the self-diagnoses of the components 5, step 24 can be effected in an automated form. If all criteria relating to the functional reliability of the components 5 of the acting item 4 are met, the temporary certificate 12 is issued in unrestricted form, whereby the components 5 involved are authorized to perform the charging process. If certain criteria are not met, a decision about a functional restriction can be taken when the temporary certificate 12 is issued. By way of example, the acting item 4, as a representative of an electric vehicle, cannot be authorized to perform a charging process according to charging mode 4 as per IEC 62251-1, however, can be authorized to perform a charging process according to charging mode 3.

The temporary certificate 12 can be deposited in the acting item 4. This allows the functional reliability of the component 5 involved to be verified within a validity period of the temporary certificate 12.

LIST OF REFERENCE SYMBOLS

1 Root certification center
2 Manufacturer
3 Technical test center
4 Acting item
5 Electromobility component
6 Module for implementing security functions
7 Root certificate
8 Manufacturer certificate
9 Test center certificate
10 First certificate
11 Second certificate
12 Temporary certificate
13 Step (registration)
14 Self-diagnosis method examination (creation of first certificate)
15 Manufacturing process (creation of second certificate)
16 Step (transmission)
17 Installation process
18 Step (1a) trigger
19 Step (2a)
20 Step (2b)
21 Step (1b)
22 Step (1c)
23 Step (1d)
24 Step (1e)

The invention claimed is:

1. A method for verifying functional reliability of electromobility components (5) of an electric vehicle (4) or of an electric charging station (4), which electromobility components (5) are involved in a charging process, wherein the functional reliability is verified within the context of said charging process or in the course of an examination, wherein at least one of the electromobility components (5) comprises a module (6) for implementing security functions that stores a first assigned certificate (10) of a technical test center (3) related to execution of a self-diagnosis on the electromobility component (5) and a second assigned certificate (11) of a manufacturer (2), wherein the method comprises the execution of the following steps:
 (1a) activating the self-diagnosis of the electromobility component (5),
 (1b) using the second assigned certificate (11) of the manufacturer (2) to furnish a result of the self-diagnosis on the component (5) with a signature,
 (1c) assigning the result of the self-diagnosis to the electric vehicle/electric charging station (4),
 (1d) transmitting the result of the self-diagnosis furnished with the signature and the assignment of the result to the electric vehicle/electric charging station (4) to the technical test center (3)
 (1e) inspecting a validity of the signature and validating the result of the self-diagnosis, and
 (1f) verifying the functional reliability of the electromobility components by issuing a temporary certificate (12) based on the validity of the signature and the result of the validation.

2. The method as claimed in claim 1, characterized in that steps (1e) and (1f) are executed by the technical test center (3).

3. The method as claimed in claim 1, characterized in that for the purpose of reciprocal verification of functional reliability for a plurality of electric vehicle/electric charging station (4), step (1f) involves at least the decision regarding the result of the validation being taken jointly by the electromobility components (5) of the electric vehicle/electric charging station (4) that are involved.

4. The method as claimed in claim 2, characterized in that in the issuing of the temporary certificate (12) a decision about a functional restriction is taken.

5. The method as claimed in claim 1, characterized in that after step (1a) and before step (1b) the following steps are executed for each of the electromobility components (5) involved:
 (2a) performing an integrity test of a self-diagnosis method of the electromobility component (5) involved using the module (6) for implementing security functions, and
 (2b) performing the self-diagnosis method of the electromobility component (5) involved only if the result of the integrity test is positive.

6. The method as claimed in claim 1, characterized in that the first assigned certificate (10) is awarded by the technical test center (3) following a successful execution of the self-diagnosis of the electromobility component (5).

7. The method as claimed in claim 1, characterized in that the activation of the self-diagnosis is initiated by a trigger (18).

8. The method as claimed in claim 1, characterized in that the inspection of the validity of the signatures by the technical test center (3) is effected on the basis of a public portion of the second assigned certificate (11) of the manufacturer (2), which portion has been deposited at the technical test center (3) by the manufacturer (2) of the respective electromobility component (5) at an earlier time.

9. The method as claimed in claim 1, characterized in that step (1*f*) is executed in an automated form.

10. The method as claimed in claim 1, characterized in that the first assigned certificate (10) of the technical test center (3) and the second assigned certificate (11) of the manufacturer (2) are derived from at least one root certificate (7).

11. The method as claimed in claim 1, characterized in that the temporary certificate (12) is issued either in the course of a regularly scheduled examination by the technical test center (3) for the technical acceptance testing of electromobility components (5) of the electric vehicle/electric charging station (4), which is particularly formed as an electric vehicle or electric charging station, or in fully automated fashion in the course of an individual charging process.

\* \* \* \* \*